May 2, 1944.  L. B. WINTON  2,347,861
MEASURING SYSTEM INCLUDING A HYDROSTATIC MANOMETER AND
AN INDICATION TRANSLATING MECHANISM
Filed Oct. 5, 1942  2 Sheets-Sheet 1
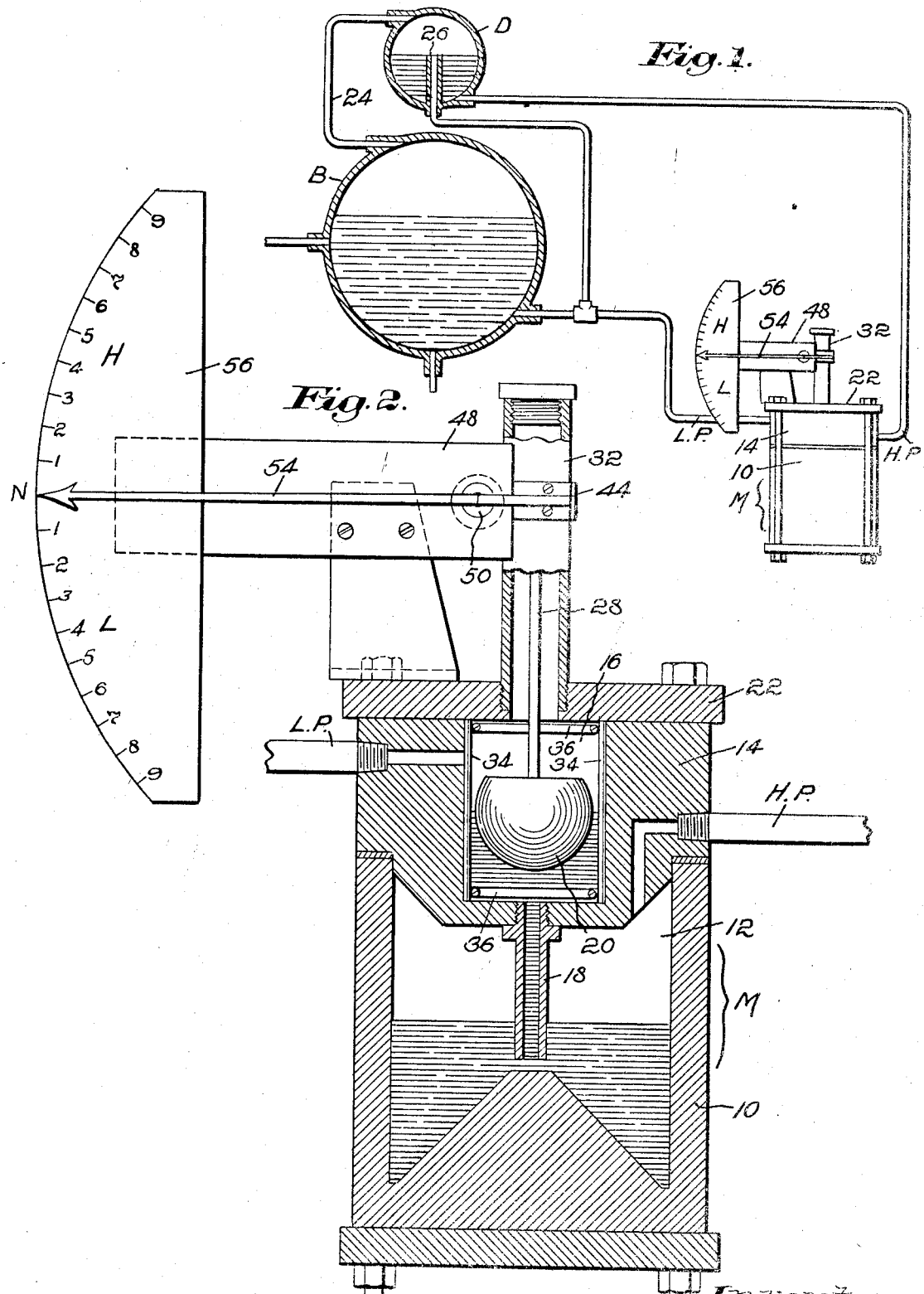

May 2, 1944. L. B. WINTON 2,347,861
MEASURING SYSTEM INCLUDING A HYDROSTATIC MANOMETER AND
AN INDICATION TRANSLATING MECHANISM
Filed Oct. 5, 1942 2 Sheets-Sheet 2
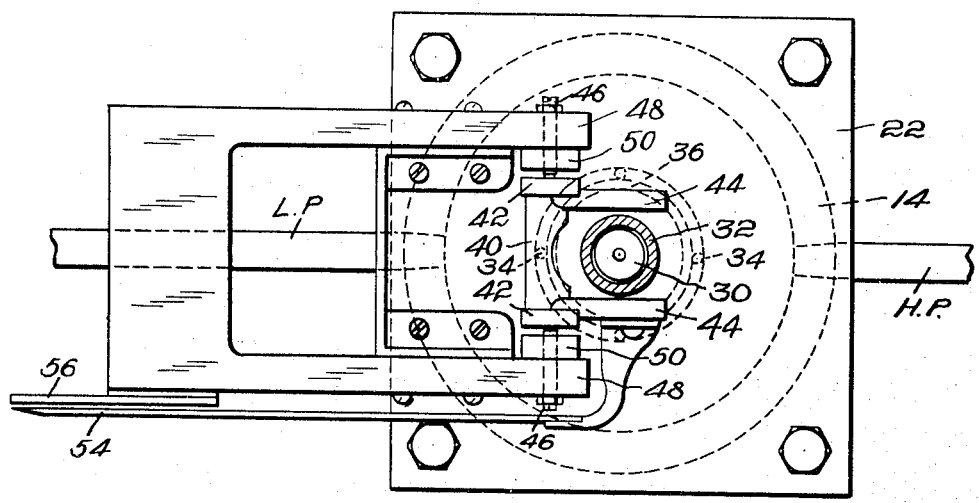
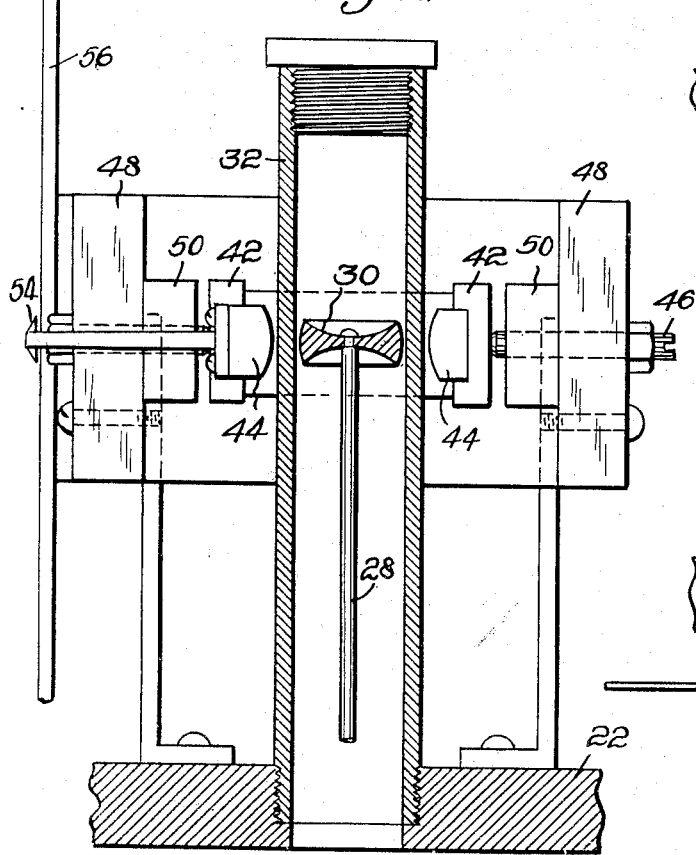
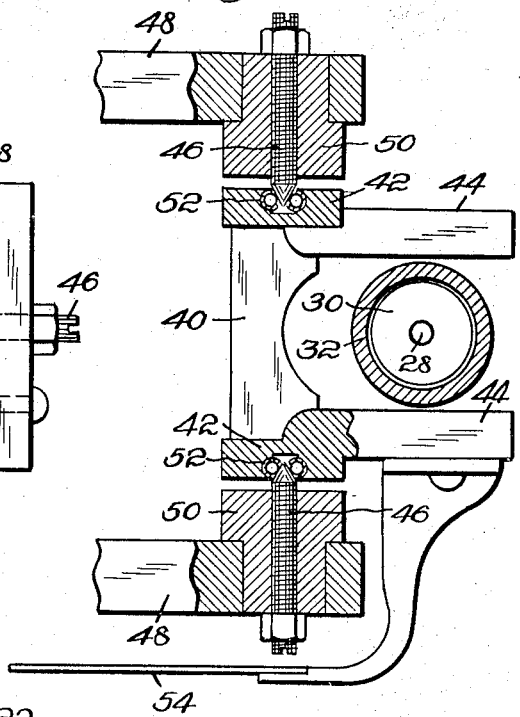
Inventor:
Lewis B. Winton,
by Emery, Booth, Townsend, Miller & Neidner,
Attys.

Patented May 2, 1944

2,347,861

UNITED STATES PATENT OFFICE 2,347,861

MEASURING SYSTEM, INCLUDING A HYDROSTATIC MANOMETER AND AN INDICATION TRANSLATING MECHANISM

Lewis B. Winton, Greenwich, Conn., assignor to Philip A. Jerguson, Medford, Mass.

Application October 5, 1942, Serial No. 460,783

20 Claims. (Cl. 73—31)

This invention relates to measuring instruments and coordinate objects are to provide a particularly reliable and sensitive hydrostatic manometer and an improved means whereby the response of such an instrument may be manifested. In particular the manometer may be of the class commonly referred to as mercury float gages, wherein a float resting on the mercury moves, its movements, which are proportionate to the fluctuations of the variable condition, being measured, and I provide not only an improved construction of float but an improved means for making manifest such movement. While by no means limited in its application thereto, my invention finds a particularly advantageous use in measuring liquid levels in systems wherein the entire system is subject to angular displacement, as, for example, in connection with a marine boiler when the ship rolls or pitches.

For an understanding of my invention, therefore, I have illustrated in the accompanying drawings and shall in the following specification describe with reference to those drawings an illustrative example of my invention as applied to a boiler. In the drawings:

Fig. 1 is a diagrammatic view showing a boiler and manometer;

Fig. 2 is a view chiefly in central vertical section showing the manometer;

Fig. 3 is a corresponding plan view but with part in section;

Fig. 4 is an enlarged vertical section in a plane at right angles to Fig. 2 through the upper portion of the instrument; and Fig. 5 is a fragmentary view corresponding to part of Fig. 3 but with parts broken away.

Referring to Fig. 2, the manometer, designated as a whole by the letter M, may comprise a metal casing 10 defining a mercury-receiving chamber 12 (high pressure well) which is closed by a massive cover 14 in which is formed a chamber 16 (low pressure well) coaxial with the well 12 and which is continued downwardly by the tube or pipe 18 which extends below the surface of the manometric liquid received in the well 12. The two wells receive bodies or columns of mercury or the like, confluent at the lower end of the pipe 18. A float 20 of a construction hereinafter to be described rests on the manometric liquid in the low pressure well 16, which well is itself closed by a cover 22, and reciprocates vertically as the differential pressure on the manometer varies, means such as that hereinafter to be described being provided for manifesting exteriorly the direction and extent of such movement.

Referring now to Fig. 1, the manometer is there shown as connected to the upper drum B of a boiler, diagrammatically shown in the figure, the connection L. P. from chamber 16 opening to the water-containing spaces in the drum beneath the normal low water level therein while the high pressure line leads to a datum chamber D located above the high water level of the boiler, preferably on the center line thereof as shown, and which may be replenished with water condensing from steam supplied through a connection 24, an overflow pipe 26 leading back to the water-containing spaces of the boiler serving to maintain a constant level in the chamber D. The differential between the constant head in the chamber D and the variable head in the drum measures the height of water in the boiler. For clearness in Figs. 2 through 5 I have not indicated by lining the water which in the arrangement shown in Fig. 1 would overlie the mercury columns in chambers 12 and 16. The use of a mercury manometer connected to a boiler with a datum chamber is disclosed in the Tripp Patent 722,645. As I have pointed out in my copending application, Serial No. 460,216, if the datum chamber is located on the center line of the boiler and is utilized in connection with a hydrostatic manometer wherein the legs are coaxial, at least in those parts thereof wherein the surfaces of the manometric liquid move within the range of the instrument, surging of the boiler water or of the manometric liquid will not alter the indication of the manometer which at all times will correspond to the theoretically constant level of the water at the center line of the drum.

The manometer herein illustrated is adapted to be completely enclosed without requiring any stuffing boxes for transmission of its indications to an external mechanism such as is utilized by many manometers and without requiring any transparent portion to permit direct observation of the levels. Herein the float 20 has projecting upwardly therefrom a rod 28 of non-magnetic material carrying (see Fig. 4) a button-like "inner armature" of magnetic material 30, extending into a closed pressure-tight tube 32 secured to the cover 22 of the well 16, this armature 30 as it reciprocates in the tube being adapted magnetically to influence exterior mechanism whereby the fluctuations of the manometric liquid are manifested. To provide an efficient mechanism of this nature and particularly one having important advantages for use in connection with systems subject to bodily displacement, both the float mechanism as such and the translating mechanism are of novel form.

I believe it will be clearest to describe in detail the actual form of float mechanism herein illustrated as the theoretical reasons underlying the construction and the advantages attending its use will then be clearly understood. The main body 20 of the float which is partially emersed in the mercury is a major segment of a solid metal sphere which floats freely on the mercury between and with a slight clearance from vertical guide rods 34, herein shown as positioned around the walls of the well 16 by positioning rings 36. The top of the sphere is cut away as shown and the stem 28 arises centrally therefrom. This stem and the armature 30 carried thereby are of substantially less mass than the absent segment of the sphere but their moment about the center of the sphere is designed to be the same as the moment of the absent part. The center of mass of the float as a whole is thus at the spherical center. The mass of the part cut away and the mass of the rod and armature are so calculated (taking into account any buoyant forces on the parts emersed from the mercury, such as would be exerted in the example shown by the low pressure water column) that the float rides with its equatorial plane at the mercury level. That is, the spherical center and the center of mass of the float as a whole are at the mercury level.

A solid steel ball would float in mercury with its center of gravity below the mercury level, and if the system were inclined the ball would tend to roll "down-hill" and any structure supported by such a ball would be displaced angularly. The weight of any such superposed structure and its moment when so inclined would aggravate these conditions. If we consider, on the other hand, a float in the form of a vertical cylinder, it would tend to ride in stable equilibrium and to remain vertical when the system was inclined with the same result as if it were tipped bodily within the manometer. In the construction herein disclosed, however, the metacenter of the float coincides with its center of mass at the spherical center and continues to do so if the mercury is inclined through a substantial angle, that is, until the mercury reaches the top of the spherical segment. As a result, if the float as described were placed in a body of mercury (with water or air above as the case required) with no mechanical means for keeping it from overturning, there would be no overturning force at any angle within the limits described. The float is in neutral equilibrium at all times and an inclination of the system produces no normal pressure between the armature 30 and the tube in which it moves or between the float proper and the guides 34 which serve roughly to position it. The movement is thus entirely free and the clearance between the armature 30 and tube 32 may be made exceedingly small, which is of advantage in connection with the magnetic transmission which will hereinafter be described.

The magnetic manifesting system is itself of such a nature as to preserve the advantages arising from the float construction. Movement of the armature 30 from a normal position corresponding to the middle of the range of the instrument or normal water level in the boiler is arranged to affect magnetically an exterior system and cause a corresponding movement thereof, preferably angular. For this purpose an outer armature is provided which, as best seen in Figs. 4 and 5, may take the form of a yoke having a base piece 40 of non-magnetic material, such as brass, supporting at either side thereof side members of steel, each comprising a central disc-like portion 42 from which projects bar-like arms 44 adapted to extend across the sides of the tube 32 in close opposition thereto and, when the armature is in its middle position, lying horizontally in the same plane, as indicated in Fig. 4. The non-magnetic bar 40 serves to connect the parts as a unit and permit their mounting as a unit and also may be utilized as a counterweighting means whereby the outer armature as a whole will be gravitationally balanced about a pivot line extending through the centers of the discs 42. The outer armature is pivoted on this line on pivots 46 between the poles of a powerful magnet 48. The magnet may be provided with pole pieces 50 aligning with the discs 42 and the pivot pins preferably engage in small ball bearings 52 received in these discs, the balls providing a metallic conductive connection eliminating an undesirable air gap. The magnet induces a high magnetic flux in the relatively small and light rotating outer armature, and as the inner armature 30, reciprocating in response to the movements of the mercury in the manometer, moves in the field it turns the outer armature.

The shape of the ends of the magnet 48 and of the pole pieces and the position of the latter thereon are designed to secure a condition of magnetic balance in the system so that there will be no particular concentration of flux at any point within the range of movement of the armature in the normal operation of the instrument tending to draw it to any particular position. Also the field between the two disc-like members 42, at the left of the tube 32, viewing Fig. 5, and the field between the distal ends of the arms 44 at the right of the tube should be equal so that the inner armature does not tend to move either to the right or left, viewing that figure. Magnetic balance is attained when, if the outer armature is gravitationally balanced and the inner armature 30 is absent, the former will indifferently assume any position within its range; that is, we may move it to any such position and it will stay there. The size, shape and relative position of the magnet legs, the pole pieces 50 and the parts 42 and 44 of the outer armature are all involved. The drawings, while not to accurate scale, closely represent with the parts shaped and generally proportioned as shown one satisfactory construction. In some instances if a given construction were found not to be in magnetic balance, the matter could be corrected by a relative repositioning of some of the parts or by the addition of magnetizable pieces of proper size and in the proper locations, taking care not to disturb the mechanical balance of the outer armature or to compensate for any consequent disturbance of such mechanical balance.

Referring to Fig. 4, it will be seen that the inner armature has a rounded edge and the bars 44 opposing the same are similarly rounded so that they most nearly approach each other in a single horizontal plane.

An important advantage arises from the use of a permanent magnet as shown in that it requires no auxiliary services, a feature particularly desirable for war vessels.

The non-magnetic tube 32 may be as small as ¼ of an inch in inside diameter and its thickness then may be as little as $\frac{1}{32}$ of an inch. Such a tube will stand high internal pressures and at the same time give small air gaps between the inner and outer armatures, thereby producing a strong coupling with reasonable magnetic flux and relatively low magnetic resistance. As already mentioned, the shape of the magnetic elements of the outer armature is such and the inner and outer armatures may be so accurately positioned with respect to each other that there will be little magnetic unbalance and no important thrust toward or away from the pivots exerted on the inner armature, thereby avoiding any important friction between the inner armature and the tube while the outer armature may be so accurately positioned with respect to the pole pieces of the permanent magnet that there will be little axial thrust, thereby avoiding important friction at the pivots but giving relatively low magnetic reluctance.

The angular movement of the outer armature may be manifested by a pointer 54 attached to one of the arms 44 and adapted to cooperate with a scale 56 (Fig. 2). The weight of this pointer should, of course, be taken into account in effecting gravitational balance of the outer armature as above referred to. The relation between the linear travel of the inner armature 30 and the angular travel of the outer armature is nearly proportional for a total angle up to about 30°. For further travel of the inner armature the angular travel of the outer armature is less. The indicating scale is therefore compressed at either end. In the case of a boiler this is not undesirable as readability near the normal level is most required but at the extremes of the range the fact that the water is unduly low or unduly high is the chief matter of interest while a very long scale is not desired.

The construction described utilizing an outer armature in which a flux is induced from the stationary magnet permits the pivot of the outer armature to be set very close to the center line of the tube 32. In the case of a boiler, for instance, the variation of a few inches of water does not cause a large absolute movement of the level of the mercury surface and the correspondingly restricted range of the armature 30 calls for it to act through a relatively short crank arm on the part which it drives. Changes in calibration, that is, the adjustment of the amount of travel of mercury and float which will cause the pointer to move over a full scale, can be readily effected by moving the whole magnet 48 with the pivots and outer armature nearer to or further from the center line of the tube. That is, relatively speaking, we move the driver or inner armature 30 to or from the center of the driven crank arm.

I have herein referred to the part 32 as a tube. Clearly it would usually be convenient and, in the case of an instrument subject to considerable internal pressure, desirable to make it, as shown in the drawings, a tube or pipe of circular cross-section and with an integral wall. Clearly, however, the restricted dimension of the part between the arms of the outer armature is the important factor involved rather than the particular cross-section or construction and the word "tube" must be read with this fact in mind unless the context otherwise indicates.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A hydrostatic manometer having a chamber wherein the center of the surface of the manometric liquid remains at a fixed height when the instrument is inclined, a float resting centrally on the liquid in said chamber comprising a partly immersed body having a stem rising therefrom providing means at the upper end thereof for manifesting the height of the liquid column, the float as a whole having its center of mass and its metacenter substantially coincident.

2. A hydrostatic manometer comprising coaxial communicating chambers for the manometric liquid, a float carried by one of the liquid columns and disposed along said axis, said float comprising a partly immersed body having a stem rising therefrom providing means at the upper end thereof for manifesting the height of the liquid column, the float as a whole having its center of mass and its metacenter substantially coincident.

3. A manometer comprising communicating chambers for a manometric liquid, one of said chambers having a tubular upward extension centrally therefrom, a float in the liquid in the latter chamber comprising a partly immersed body and a stem rising into said extension providing means at the upper end of the stem for manifesting the height of the liquid column, the float as a whole having its center of mass and its metacenter substantially coincident.

4. A manometer comprising communicating chambers for a manometric liquid, one of said chambers having a tubular upward extension centrally therefrom, means for admitting fluid under pressure to said chambers to act on the liquid, the chambers being otherwise completely sealed, a float in the liquid in the said one chamber comprising a partly immersed body, a stem rising therefrom into said extension, an armature at the upper end of the stem, means external to the system free from mechanical connection or engagement with the armature but influenced by the traverse of said armature relative thereto to manifest the height of the liquid column, the float as a whole having its center of mass and its metacenter substantially coincident.

5. A float gage having a float comprising a spherical body cut away at its upper side and having a manifesting means projecting therefrom, the center of mass of the float being at the spherical center and the float being immersed substantially to an equatorial plane of the sphere.

6. A float gage comprising a chamber for a liquid column, a float resting freely on said column comprising a partly spherical body and an upward projection, the gage comprising means laterally opposing the float with slight clearances to center the same on the column, the center of mass of the float being at the spherical center and the float being immersed substantially to an equatorial plane of the sphere.

7. A float gage comprising a chamber for a liquid column and having an upward tubular extension of relatively small cross section, a float resting freely on the column comprising a partly spherical body having an upward projection into said extension, the center of mass of the float being at the spherical center and the float being immersed substantially to an equatorial plane of the sphere.

8. A float gage comprising a chamber for a liquid column and having an upward tubular extension of relatively small cross section, a float resting freely on the column comprising a partly spherical body having an upward projection into said extension, guiding means in the chamber loosely opposing the spherical body laterally thereof to center the same beneath the extension, the center of mass of the float being at the spherical center and the float being immersed substantially to an equatorial plane of the sphere.

9. A float gage comprising a chamber for a liquid column and having an upward tubular extension of relatively small cross section, a float resting freely on the column comprising a partly spherical body having an upward projection into said extension and an armature at the end of the projection, means external to the extension free from mechanical connection or engagement with the armature but influenced by the traverse of said armature relative thereto to manifest the height of the column, the center of mass of the float being at the spherical center and the float being immersed substantially to an equatorial plane of the sphere.

10. A float gage comprising a chamber for a liquid column and having an upward tubular extension of relatively small cross section, a float resting freely on the column comprising a partly spherical body having an upward projection into said extension and an armature at the end of the projection, the center of mass of the float being at the spherical center and the float being immersed substantially to an equatorial plane of the sphere, an outer armature pivoted at one side of the extension and having arms at either side thereof extending across the same transversely to the path of the inner armature, and a magnet having poles opposing the arms of the outer armature to induce a magnetic flux therebetween.

11. A measuring instrument comprising a tube of non-magnetic material, a disc of magnetic material within the tube and means to cause said disc to reciprocate in the tube in response to the fluctuations of a variable condition, an armature pivoted adjacent the tube having magnetizable arms projecting from the pivot and extending at either side of the tube transversely to the path of said disc, and a magnet having poles opposing said arms to induce a magnetic flux therebetween, the angular position of said arms indicating the position of the disc.

12. A measuring instrument comprising a tube of non-magnetic material, a disc of magnetic material within the tube and means to cause said disc to reciprocate in the tube in response to the fluctuations of a variable condition, an armature pivoted adjacent the tube having magnetizable arms projecting from the pivot and extending at either side of the tube transversely to the path of said disc, said armature being in substantial gravitational balance about its pivot line, a magnet having poles opposing said arms to induce a magnetic flux therebetween, the shape and relative disposition of the magnetizable parts of the armature and magnet being such that in the absence of said disc the arms will not tend to assume any particular position within their operating range.

13. A measuring instrument comprising a tube of non-magnetic material, a disc of magnetic material within the tube and means to cause said disc to reciprocate in the tube in response to the fluctuations of a variable condition, a pair of magnetizable arms pivoted adjacent the tube and extending from the pivot across the tube transversely to the path of the disc and means to induce between the arms a magnetic flux of substantially uniform density at the sides of the tube which are proximal to and distal of the pivot and throughout an operating range of angular displacement of the arms, such displacement serving to manifest the position of the disc.

14. A measuring instrument comprising a tube of non-magnetic material, a disc of magnetic material within the tube and means to cause said disc to reciprocate in the tube in response to the fluctuations of a variable condition, an armature having magnetizable arms projecting at either side of the same transversely to the path of the disc, and a magnet of horse shoe type, the armature being pivoted to and between the poles of the magnet.

15. A measuring instrument comprising a tube of non-magnetic material, a disc of magnetic material within the tube and means to cause said disc to reciprocate in the tube in response to the fluctuations of a variable condition, an armature having magnetizable arms projecting at either side of the same transversely to the path of the disc, and a magnet of horse shoe type, the armature being pivoted to and between the poles of the magnet by pivot means which engage ball bearings in one of the parts whereby to provide a conductive path through the balls.

16. A measuring instrument comprising a tube of non-magnetic material, a disc of magnetic material within the tube and means to cause said disc to reciprocate in the tube in response to the fluctuations of a variable condition, an exterior armature comprising a pair of magnetizable members, including disc-like bases and radial arms which project across opposite sides of the tube transversely to the path of the disc, and a magnet of the horse shoe type between the legs of which said bases are pivoted.

17. A measuring instrument comprising a tube of non-magnetic material, a disc of magnetic material within the tube and means to cause said disc to reciprocate in the tube in response to the fluctuations of a variable condition, an exterior armature comprising a pair of magnetizable members, including disc-like bases and radial arms which project across opposite sides of the tube transversely to the path of the disc, a magnet of the horse shoe type between the legs of which said bases are pivoted, and pole pieces on said legs substantially opposing said bases.

18. A measuring instrument comprising a tube of non-magnetic material, a disc of magnetic material within the tube and means to cause said disc to reciprocate in the tube in response to the fluctuations of a variable condition, an exterior armature pivoted adjacent the tube and comprising magnetizable arms projecting radially from the pivot across opposite sides of the tube transversely to the path of the disc, a magnet having poles between which the armature is pivoted, whereby to induce a magnetic flux in the armature, the armature when the disc is absent being in neutral equilibrium at any point within a substantial angle to either side of the horizontal.

19. An indicating mechanism including a manometer of the differential hydrostatic type having a chamber containing a column of manometric liquid on which rests a float, the submerged portion of the float being a hemisphere and the emersed portion for a substantial angular distance above the liquid surface being a continuation of the same spherical surface, and means external to the chamber free from mechanical connection or engagement with the float and relative to which the float moves as the liquid level varies, said means being constructed and arranged to be influenced by the variations in relative position to manifest the vertical position of the float and thereby the height of the liquid column.

20. An indicating mechanism including a manometer of the differential hydrostatic type having a chamber containing a column of manometric liquid on which rests a float, the submerged portion of which is a hemisphere, the metacenter is in the plane of the liquid surface and its center of mass substantially coincident therewith, and means external to the chamber free from mechanical connection or engagement with the float and relative to which the float moves as the liquid level varies, said means being constructed and arranged to be influenced by the variations in relative position to manifest the vertical position of the float and thereby the height of the liquid column.

LEWIS B. WINTON.